(12) United States Patent
Wu (10) Patent No.: US 11,715,965 B2
(45) Date of Patent: Aug. 1, 2023

(54) CHARGING DEVICE AND CHARGING SYSTEM

(71) Applicant: BEIJING XIAOMI MOBILE SOFTWARE CO., LTD., Beijing (CN)

(72) Inventor: Kaiqi Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 123 days.

(21) Appl. No.: 17/240,959

(22) Filed: Apr. 26, 2021

(65) Prior Publication Data

US 2022/0069601 A1    Mar. 3, 2022

(30) Foreign Application Priority Data

Aug. 31, 2020  (CN) .......................... 202010901150.5

(51) Int. Cl.
*H02J 50/90* (2016.01)
*H02J 7/00* (2006.01)
*H02J 50/10* (2016.01)
*H02J 7/02* (2016.01)

(52) U.S. Cl.
CPC .............. *H02J 7/0045* (2013.01); *H02J 7/02* (2013.01); *H02J 50/10* (2016.02)

(58) Field of Classification Search
CPC ....................................................... H02J 50/90
USPC ........................................................ 320/108
See application file for complete search history.

(56) References Cited

U.S. PATENT DOCUMENTS

| 9,853,507 | B2 | 12/2017 | Jol et al. | |
|---|---|---|---|---|
| 2009/0027149 | A1* | 1/2009 | Kocijan | H01F 7/0273 335/288 |
| 2012/0146576 | A1* | 6/2012 | Partovi | H02J 7/0044 320/108 |
| 2019/0198212 | A1* | 6/2019 | Levy | H04M 1/04 |
| 2020/0014243 | A1 | 1/2020 | Kim et al. | |

OTHER PUBLICATIONS

Extended European Search Report in European Application No. 21170412.7, dated Sep. 24, 2021, (7p).

* cited by examiner

*Primary Examiner* — Edward Tso
*Assistant Examiner* — Ahmed H Omar
(74) *Attorney, Agent, or Firm* — Arch & Lake LLP (57) ABSTRACT

A charging device and a charging system are provided. The charging device includes a charging portion and a plurality of magnetic attracting portions. The plurality of magnetic attracting portions are arranged symmetrically with respect to the charging portion. Each of the plurality of magnetic attracting portions includes an N pole and an S pole. At least one of the N poles and/or at least one of the S poles serves as an attracting function pole of the magnetic attracting portion, and a pair of attracting function poles symmetrical with respect to the charging portion are different in polarity.

17 Claims, 7 Drawing Sheets

CHARGING DEVICE AND CHARGING SYSTEM

CROSS-REFERENCE TO RELATED APPLICATION

This application is based upon and claims priority to Chinese Patent Application No. 202010901150.5, filed on Aug. 31, 2020, the content of which is hereby incorporated by reference in its entirety for all purposes.

TECHNICAL FIELD

The present disclosure relates to the field of electronic technology, and more particularly, to a charging device and a charging system.

BACKGROUND

Wireless charging technology is widely used in electronic products such as mobile phones. In a wireless charging process, a wireless charging transmitting coil of a charging transmitting device mates with a wireless charging receiving coil of a charging receiving device to implement wireless charging of electronic products such as mobile phones.

In the related arts, the types of electronic products using the wireless charging technology, such as a charging base and a mobile phone, are increasing, and a wireless charging transmitting device and a wireless charging receiving device are generally in a one-to-one corresponding matching relationship. Charging portions of different types of charging transmitting devices and charging receiving devices cannot implement alignment and mating in structure, so that wireless charging cannot be performed.

SUMMARY

The present disclosure provides a charging device and a charging system to enable adaptive charging between the charging devices and improve usage convenience of the charging devices.

According to a first aspect of the present disclosure, there is provided a charging device including a charging portion and a plurality of magnetic attracting portions. The plurality of magnetic attracting portions are symmetrically arranged with respect to the charging portion. Each of the plurality of magnetic attracting portions includes an N pole and an S pole. At least one of the N poles, at least one of the S poles, or at least one of the N poles and at least one of the S poles serve as an attracting function pole of the magnetic attracting portion. Further, a pair of attracting function poles symmetrical with respect to the charging portion are different in polarity.

According to a second aspect of the present disclosure, there is provided a charging system including a charging device. The charging device includes a charging portion and a plurality of magnetic attracting portions. The plurality of magnetic attracting portions are symmetrically arranged with respect to the charging portion. Each of the plurality of magnetic attracting portions includes an N pole and an S pole. At least one of the N poles, at least one of the S poles, or at least one of the N poles and at least one of the S poles serve as an attracting function pole of the magnetic attracting portion. Further, a pair of attracting function poles symmetrical with respect to the charging portion are different in polarity.

It should be understood that both the foregoing general description and the following detailed description are exemplary and explanatory only and cannot limit the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Wireless charging technology is widely used in electronic products such as mobile phones. In a wireless charging process, a wireless charging transmitting coil of a charging transmitting device mates with a wireless charging receiving coil of a charging receiving device to implement wireless charging of electronic products such as mobile phones. In the related arts, the types of electronic products using the wireless charging technology such as a charging base and a mobile phone are increasing, and a wireless charging transmitting device and a wireless charging receiving device are generally in a one-to-one corresponding matching relationship. Charging portions of different types of charging transmitting devices and charging receiving devices cannot implement alignment and mating in structure, so that wireless charging cannot be performed.

Figure 1:
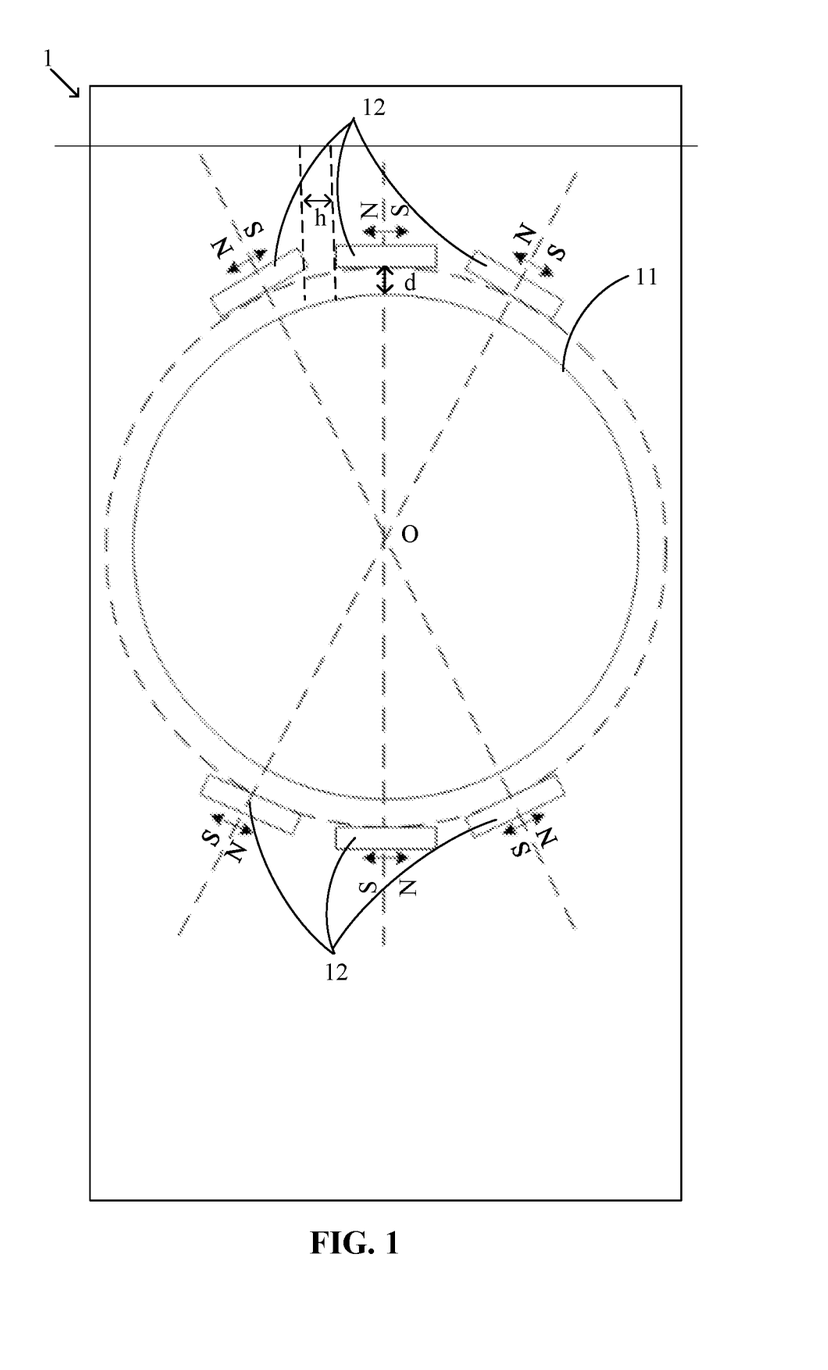
FIG. 1 is a first perspective structural diagram of a charging device according to an exemplary embodiment of the present disclosure.

The present disclosure provides a charging device, where the charging device includes a charging portion and multiple magnetic attracting portions. The magnetic attracting portions are symmetrically arranged with respect to the charging portion. Each of the magnetic attracting portions includes an N pole and an S pole, at least one of the N poles and/or at least one of the S poles serving as an attracting function pole of the magnetic attracting portion, and a pair of the attracting function poles symmetrical with respect to the charging portion is different in polarity. The N pole may be referred as the positive pole while the S pole may be referred as the negative pole. FIG. 1 is a schematic structural diagram of a charging device according to an exemplary embodiment of the present disclosure. As shown in FIG. 1, the charging device 1 includes a charging portion 11 and six magnetic attracting portions 12. The magnetic attracting portions 12 are symmetrically arranged with respect to the charging portion 11. The magnetic attracting portion 12 includes the N pole and the S pole, one N pole and one S pole serving as attracting function poles of the magnetic attracting portion 12, and a pair of the attracting function poles symmetrical with respect to the charging portion 11 is different in polarity.

It should be noted that the charging device 1 may be a device having a wireless charging function, such as a mobile phone, a wearable device, a tablet computer, an in-vehicle terminal, a medical terminal, a charging base, or a power bank. The present disclosure does not limit the type of the charging device 1.

The magnetic attracting portions 12 are arranged symmetrically with respect to the charging portion 11, each of the magnetic attracting portions 12 includes the N pole and the S pole, at least one of N poles and/or the at least one of S poles serving as the attracting function pole of the magnetic attracting portion 12, and a pair of attracting function poles symmetrical with respect to the charging portion 11 is different in polarity. The above-mentioned structural arrangement not only enables the charging device to implement the adaptation with the charging base and the power bank by using the magnetic attracting portion 12, but also enables the implementation of the adaptation between two charging devices 1 by using the attracting function poles that are symmetrically arranged and have different polarities, it is thus possible to improve the adaptability and usage convenience of the charging device 1 in the charging process.

The charging portion 11 may be a wireless charging coil, which is controlled to implement a wireless charging transmitting function or a wireless charging receiving function in different operating scenarios. The wireless charging coil may have a shape of a circular, a rectangular, or other irregular shape, and the shape of the wireless charging coil is not limited in the present disclosure.

In some embodiments, the shape of the positioning structure formed by one or more magnetic attracting portions 12 may include at least one of a circle, an ellipse, or a rectangle. The shape of the positioning structure formed by the magnetic attracting portion 12 may be set according to an outline shape of the charging portion 11, or may be set according to a number of the magnetic attracting portions 12 constituting the positioning structure, preset positions of the magnetic attracting portions 12, or the like, and the shape of the positioning structure is not limited in the present disclosure. For example, when the wireless charging coil of the charging device 1 forms a circular outline structure, the shape of the positioning structure may be any one of a circular, an elliptical, or a rectangular provided at the periphery of the circular outline structure of the charging transmitting coil.

When the charging device 1 is an electrical consumer such as a mobile phone, a wearable device, a tablet computer, an in-vehicle terminal, or a medical terminal, the charging portion 11 of the electrical consumer may be a wireless charging coil for implementing a wireless charging receiving function or a wireless charging transmitting function, the magnetic attracting portions 12 are arranged symmetrically with respect to the charging portion 11, at least one of N poles and/or at least one of S poles of the magnetic attracting portion 12 serving as a attracting function magnetic pole of the magnetic attracting portion 12, and a pair of attracting function poles symmetrical with respect to the charging portion 11 is different in polarity. Adaptive attracting and charging can be implemented between the electrical consumers. During the mating of the two electrical consumers, the position of at least a part of the magnetic attracting portions 12 of one electrical consumer corresponds to the position of at least a part of the magnetic attracting portions 12 of another electrical consumer to implement positioning through mutual attraction, and the position of the wireless charging coil of one electrical consumer corresponds to the position of the wireless charging coil of the other electrical consumer and the two wireless charging coils mate with each other to implement charging. Since at least one of N poles and/or at least one of S poles of the magnetic attracting portion 12 serves as the attracting function pole of the magnetic attracting portion 12, and a pair of attracting function poles symmetrical with respect to the charging portion 11 is different in polarity, the positioning through mutual attraction between the electrical consumers is facilitated, and the adaptability and the usage convenience of the electrical consumers are improved.

The position correspondence between the wireless charging coils may mean that a center of the wireless charging coil of one charging device 1 coincides with a center of the wireless charging coil of the other charging device 1, or that there is an offset within a preset error range between the center of the wireless charging coil of one charging device 1 and the center of the wireless charging coil of the other charging device 1.

When the charging device 1 is a charging base, the charging base may be used to mate with an electrical consumer such as a mobile phone, a wearable device, a tablet computer, an in-vehicle terminal, or a medical terminal, and to implement charging of the electrical consumer. During the mating of the electrical consumer and charging base, the position of at least a part of the magnetic attracting portions 12 of the charging base corresponds to the position of at least a part of the magnetic attracting portions preconfigured on the electrical consumer to implement positioning through mutual attraction, and the position of the charging portion 11 of the charging base corresponds to the position of the charging portion of the electrical consumer and the two charging portions mate with each other to implement charging. Since the magnetic attracting portions 12 of the charging base are arranged symmetrically with respect to the charging portion 11, the positioning through mutual attraction with more types of electrical consumers is facilitated, thereby improving the adaptability and usage convenience of the charging base.

Figure 2:
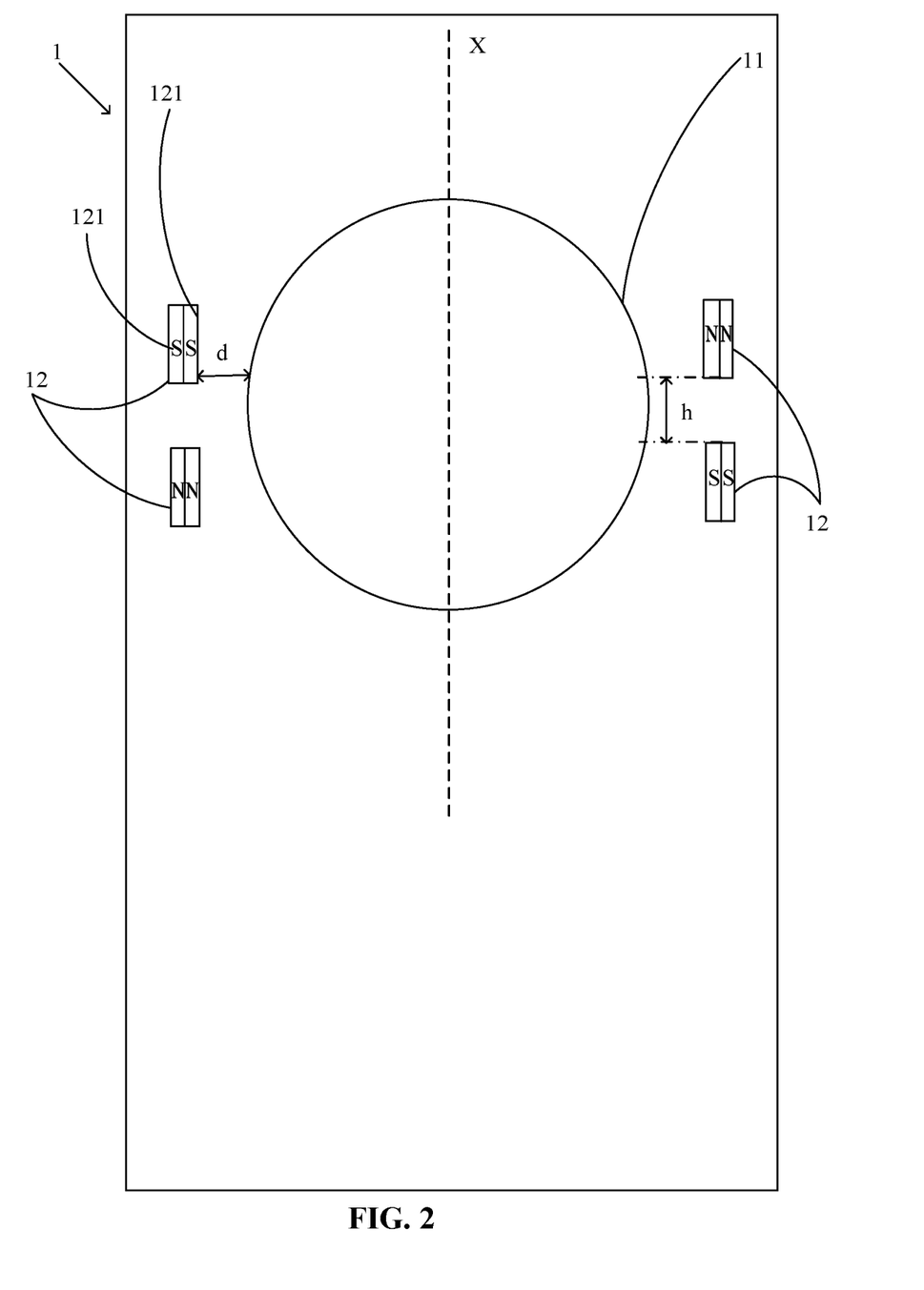
FIG. 2 is a second perspective structural diagram of a charging device according to an exemplary embodiment of the present disclosure.

In the above embodiments, the magnetic attracting portions 12 are arranged symmetrically with respect to the charging portion 11, and the symmetrical positional relationship may be that the magnetic attracting portions 12 are precisely symmetrical in position with respect to the charging portion 11, or that the magnetic attracting portions 12 are symmetrical with an allowable positional deviation with respect to the charging portion 11. In the embodiment shown in FIG. 1, the charging portion 11 includes a center point O, and the magnetic attracting portions 12 may be arranged centrally symmetrically with respect to the center point O. Take two mobile phones mating with each other to implement wireless charging as an example, the magnetic attracting portions 12 that are centrally symmetrically arranged with respect to the center point O of the mobile phone can not only implement a back-to-back charging when the top position of one mobile phone corresponds to the top position of another mobile phone, but also implement the back-to-back charging when the top position of one mobile phone corresponds to the bottom position of the other mobile phone, thereby improving the flexibility of the position mating of the charging devices during the charging process. In other embodiments, the charging portion 11 includes at least one centerline X, and the magnetic attracting portions 12 are arranged in left-right symmetric relation to each other with respect to the centerline X. For example, as shown in FIG. 2, the magnetic attracting portions 12 are symmetrical with respect to the center line X of the charging portion 11. Take two mobile phones mating with each other to implement wireless charging as an example, the magnetic attracting portions 12 in the mobile phone are arranged in left-right symmetric relation to each other with respect to the centerline X, and when the mobile phones are placed back to back and the top positions of the magnetic attracting portions 12 of the two mobile phone match with one another, wireless charging between the two mobile phones can also be implemented.

The structural arrangement of the charging device 1 and the mating relationship in the charging process will be described by using the charging device 1 being a mobile phone as an example.

In some embodiments, as shown in FIG. 1 and FIG. 2, the magnetic attracting portions 12 are arranged along the circumferential direction of the charging portion 11, and a first preset spacing d is provided between one of the magnetic attracting portions 12 and the charging portion 11. In one embodiment, the magnetic attracting portions 12 are arranged along the circumferential direction of the charging portion 11 to facilitate the combination of the one or more magnetic attracting portions 12 to form different positioning structures, thereby improving the arrangement diversity and convenience of the positioning structures. In another embodiment, a first preset spacing d is provided between one of the magnetic attracting portions 12 and the charging portion 11, and the first preset spacing d between the magnetic attracting portion 12 and the charging portion 11 reduces structural interference and functional interference between the magnetic attracting portion 12 and the charging portion 11.

In the above embodiments, the magnetic attracting portions 12 are evenly distributed along the circumferential direction of the charging portion 11, thereby reducing the design difficulty and the manufacturing difficulty of the distribution of multiple magnetic attracting portions 12, and increasing the diversity of the positioning structure. And/or, in another embodiment, the first preset spacing d between each of the magnetic attracting portions 12 and the charging portion 11 is the same, which reduces the design difficulty and the manufacturing difficulty of the distribution of multiple magnetic attracting portions 12, increases the diversity of the positioning structure, and reduces the occupation space by multiple magnetic attracting portions 12 on the charging device 1.

It should be noted that the first preset spacing d may be the shortest distance between adjacent edges of the charging portion 11 and magnetic attracting portion 12. In order to avoid structural interference and functional interference between the magnetic attracting portion 12 and the charging portion 11, while reducing occupation space of the magnetic attracting portion 12, the first preset spacing d may be greater than or equal to 0.01 mm and less than or equal to 10 mm. For example, when the charging portion 11 is a circular structure and the magnetic attracting portion 12 is a bar magnet, the first preset distance may be the shortest distance between the straight linear edge of the magnetic attracting portion 12 adjacent to the circular edge of the charging portion 11 and the circular edge of the charging portion 11. The linear edges of the bar magnets adjacent to the charging portion 11 may be perpendicular to extension lines of radii of the circular structure of the charging portion 11, so that the bar magnets are integrally arranged to be aesthetic and facilitate the formation of various positioning structures. Alternatively, the linear edge of the bar magnet may be at a preset angle to the corresponding radius of the circular structure of the charging portion 11, and the magnetic attracting portion 12 having another structure type may adopt another spatial attitude with respect to the charging portion 11, which is not limited in the present disclosure.

In some embodiments, a second preset spacing h is provided between the adjacent magnetic attracting portions 12, and the second preset spacing h is provided between adjacent magnetic attracting portions 12 so that adjacent magnetic attracting portions 12 are separated from each other in structure, thereby enabling the magnetic attracting portions to recombine to form different positioning structures. In this way, multiple positioning structures are enabled to achieve position mating with different types of charging devices 1, thereby improving compatibility with the charging devices 1.

It should be noted that the second preset spacing h may be the shortest distance between adjacent edges of the adjacent magnetic attracting portions 12, and the second preset spacing h between any pair of adjacent magnetic attracting portions 12 may be the same or different, which is not limited in the present disclosure. In order to avoid structural interference and functional interference between the magnetic attracting portions 12, while reducing the occupation space of the magnetic attracting portions 12, the second preset spacing h may be greater than or equal to 0.01 mm and less than or equal to 5 mm.

Figure 3:
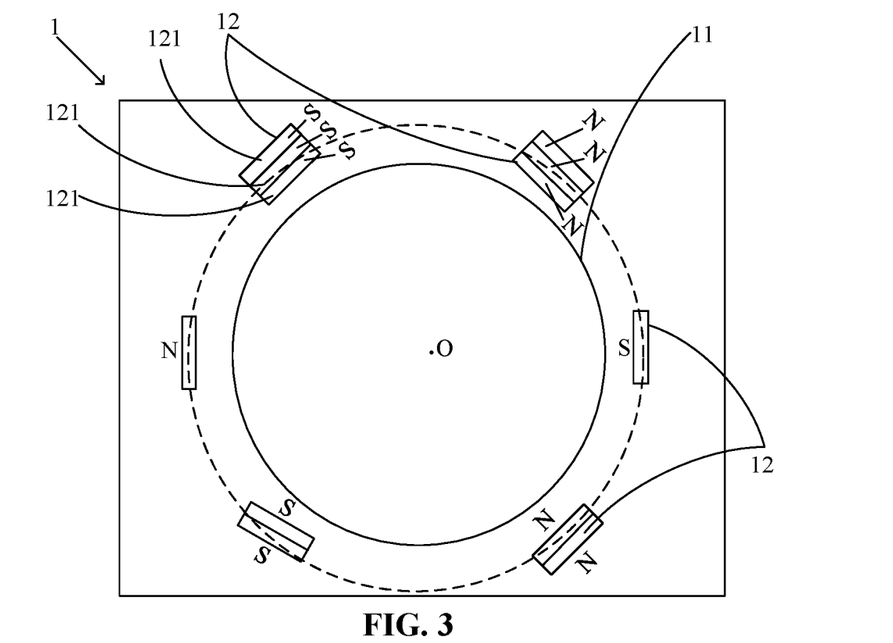
FIG. 3 is a third perspective structural diagram of a charging device according to an exemplary embodiment of the present disclosure.
Figure 4:
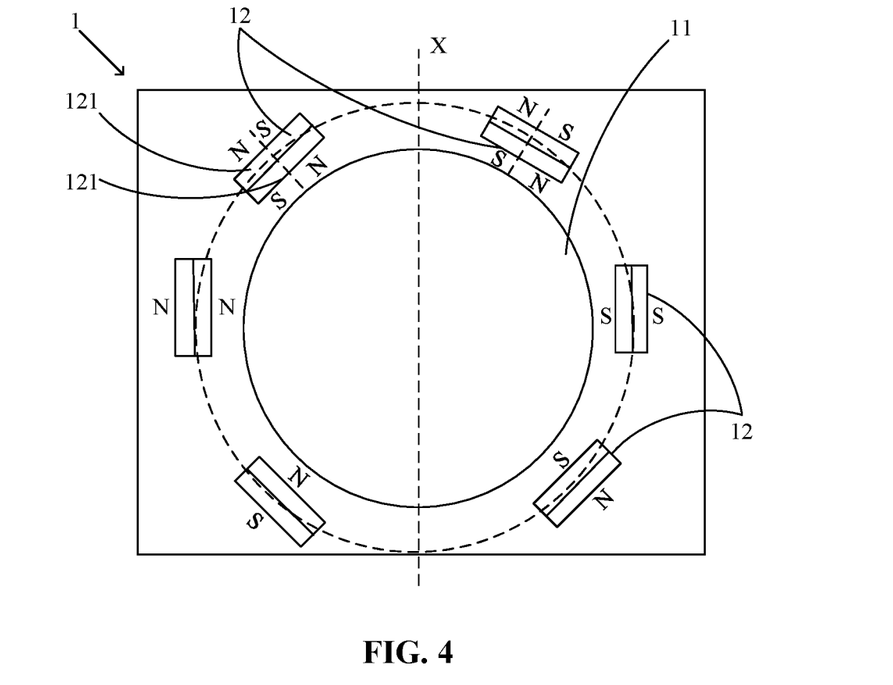
FIG. 4 is a fourth perspective structural diagram of a charging device according to an exemplary embodiment of the present disclosure.

In some embodiments, the magnetic attracting portion 12 includes at least one magnetic element 121. For example, as shown in FIG. 3, each of the magnetic attracting portions 12 includes two magnetic elements 121, which are arranged in a stacked manner, and six magnetic attracting portions 12 are arranged evenly and symmetrically along the circumferential direction of the charging portion 11 with respect to the center point O, and enclose a circular positioning structure shown by the dashed line in FIG. 3. In the embodiment shown in FIG. 4, two magnetic attracting portions 12 of a pair of the magnetic attracting portions 12 symmetrically arranged with respect to the charging portion 11 have a same number of magnetic elements 121. Specifically, the charging device 1 includes six magnetic attracting portions 12, each magnetic attracting portion of the pair of two magnetic attracting portions 12 arranged symmetrically includes one magnetic element 121, each magnetic attracting portion of the pair of two magnetic attracting portions 12 arranged symmetrically includes two magnetic elements 121, each magnetic attracting portion of the pair of two magnetic attracting portions 12 arranged symmetrically includes three magnetic elements 121; and multiple magnetic attracting portions 12 are evenly arranged along the circumferential direction of the charging portion 11, and each pair of magnetic attracting portions 12 is arranged in left-right symmetric relation to each other with respect to the centerline X.

In another embodiment, when one magnetic attracting portion of the pair of magnetic attracting portions 12 includes at least two magnetic attracting function poles, the number of magnetic elements 121 of the pair of magnetic attracting portions 12 may be different. For example, in a pair of symmetrically arranged magnetic attracting portions 12, one magnetic attracting portion 12 includes two magnetic elements 121, each of which is provided with an N pole as the magnetic attracting function pole. The other magnetic attracting portion 12 may include one magnetic element 121 whose S pole serves as a magnetic attracting function pole.

In some embodiments, the magnetic attracting portion 12 includes multiple mutually mating magnetic elements 121, and the magnetic field of the magnetic attracting portion 12 is divided by the mating of multiple magnetic elements 121, thereby reducing functional interference between the magnetic attracting portion 12 and the charging portion 11, and reducing the overall power loss of the charging device 1.

Figure 5:
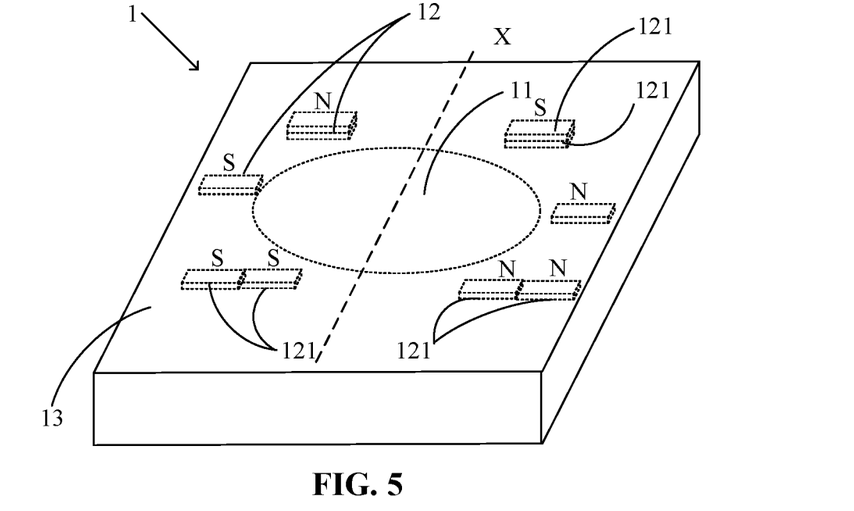
FIG. 5 is a stereoscopic structural diagram of a charging device according to an exemplary embodiment of the present disclosure.

In the above embodiments, the magnetic element 121 may be a bar magnet, and internal magnetic field directions of the magnetic elements 121 of the same magnetic attracting portion are the same or opposite. For example, as shown in FIG. 5, multiple magnetic attracting portions 12 are arranged in left-right symmetric relation to each other with respect to the centerline X, the charging portion 11 may include a magnetic attracting mating surface 13, and multiple magnetic elements 121 of the same magnetic attracting portion 12 may be arranged side by side in a direction parallel to the magnetic attracting mating surface 13. For example, each magnetic attracting portion 12 includes two magnetic elements 121, similarly, the magnetic poles facing the magnetic attracting mating surface 13 of the two magnetic elements 121 may be the same N poles or the same S poles; the magnetic pole facing the magnetic attracting mating surface 13 of one of the two magnetic elements 121 may be an N pole, and the magnetic pole facing the magnetic attracting mating surface 13 of the other may be an S pole; in addition, each of the magnetic elements 121 may include an N pole and an S pole, respectively, and the N pole and the S pole may be arranged on left and right sides or top and bottom sides of the magnetic element. And/or, the charging portion 11 may include the magnetic attracting mating surface 13, and multiple magnetic elements 121 of the same magnetic attracting portion 12 may be stacked in a direction perpendicular to the magnetic attracting mating surface 13. For example, each magnetic attracting portion 12 includes two magnetic elements 121, the magnetic poles facing the magnetic attracting mating surface 13 of the two magnetic elements 121 may be the same N poles or the same S poles; the magnetic poles facing the magnetic attracting mating surface 13 of one of the two magnetic elements 121 may be an N pole, and the magnetic pole opposing the magnetic attracting mating surface 13 of the other may be an S pole; in addition, each of the magnetic elements 121 may include an N pole and an S pole, respectively, and the N pole and the S pole may be arranged on left and right sides or top and bottom sides of the magnetic element.

Figure 6:
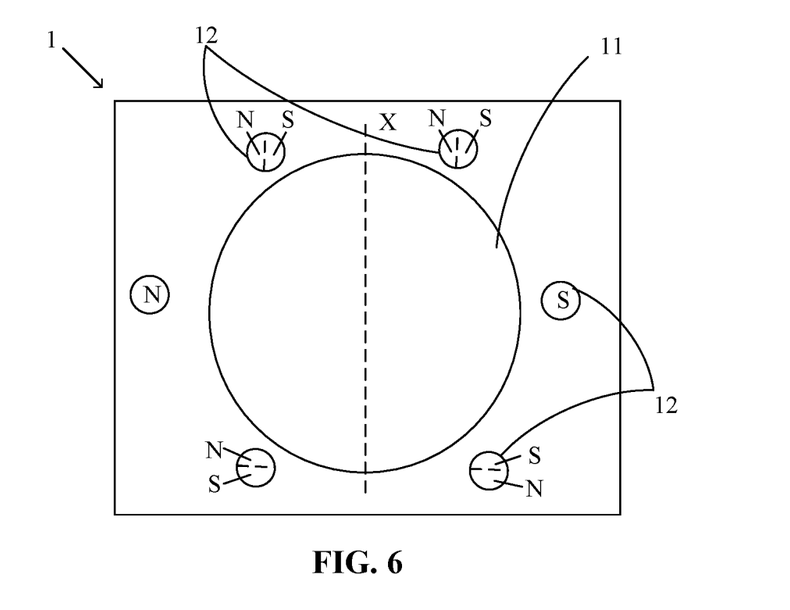
FIG. 6 is a fifth perspective structural diagram of a charging device according to an exemplary embodiment of the present disclosure.
Figure 7:
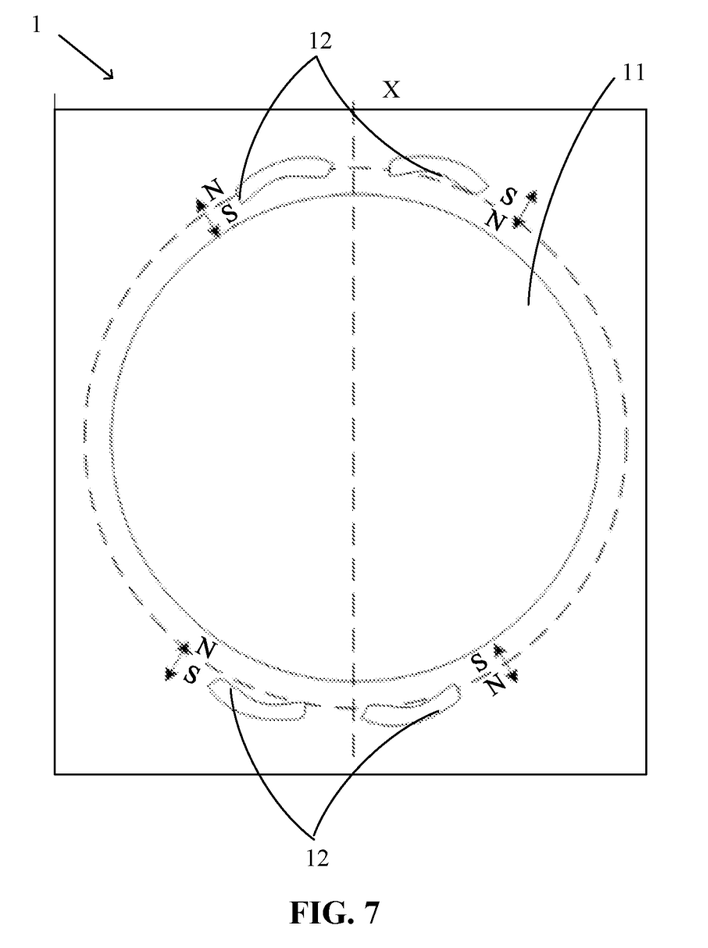
FIG. 7 is a sixth perspective structural diagram of a charging device according to an exemplary embodiment of the present disclosure.

In the above embodiments, the magnetic element 121 may include at least one of a bar magnet as shown in FIG. 1 to FIG. 5, a columnar magnet as shown in FIG. 6, and an irregularly shaped magnet as shown in FIG. 7. The structural shape and the space setting attitude of the magnetic element 121 are not limited in the present disclosure. The magnetic attracting portions 12 in FIG. 6 and FIG. 7 are arranged in left-right symmetric relation to each other with respect to the centerline X.

The magnetic attracting portions of the present disclosure are arranged symmetrically with respect to the charging portion, each of the magnetic attracting portions includes an N pole and an S pole. At least one of the N poles and/or at least one of the S poles serves as the attracting function pole of the magnetic attracting portion, and a pair of the attracting function poles symmetrical with respect to the charging portion is different in polarity. The above-mentioned structural arrangement not only enables the charging device to implement adaptation with other wireless charging devices by using the magnetic attracting portion, but also enables the implementation of the adaptation between the two charging devices by using the attracting function poles that are arranged symmetrically and have different polarities, it is thus possible to improve the adaptability and usage convenience of the charging device during the charging process.

The present disclosure further provides a charging system including the charging device 1 as described above.

It should be noted that the charging device 1 may be a device having a wireless charging function, such as a charging base, a power bank, a mobile phone, a wearable device, a tablet computer, an in-vehicle terminal, or a medical terminal.

Figure 8:
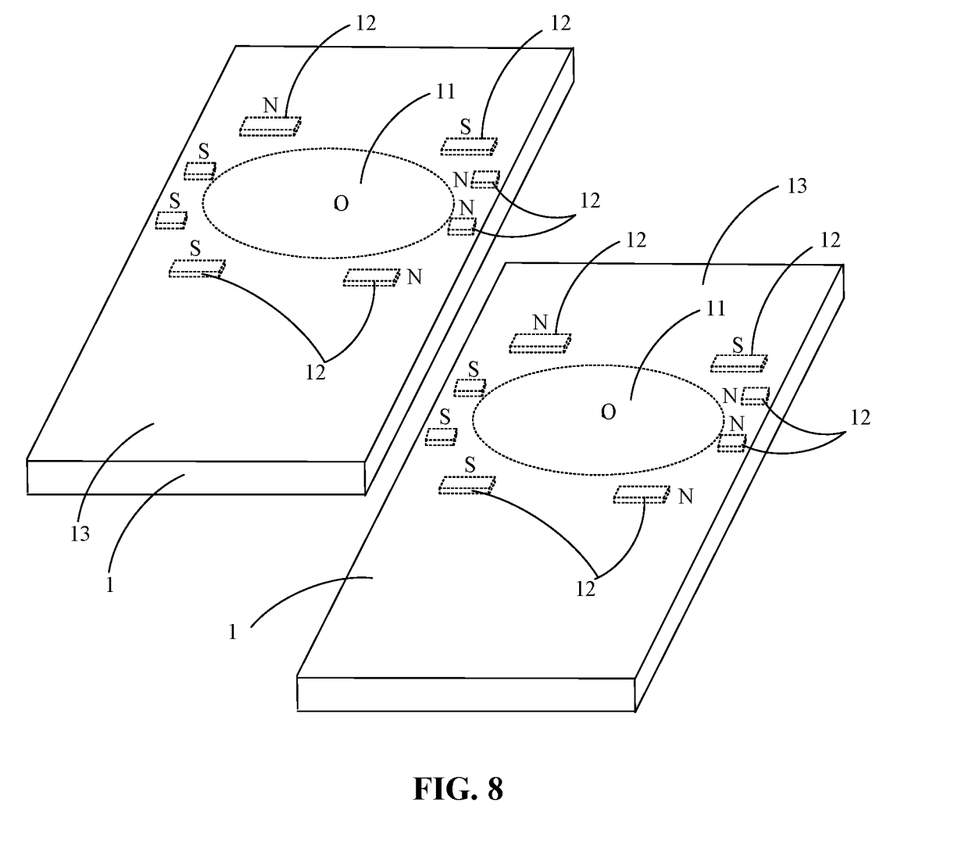
FIG. 8 is an stereoscopic exploded structural diagram of a charging system according to an exemplary embodiment of the present disclosure.
Figure 9:
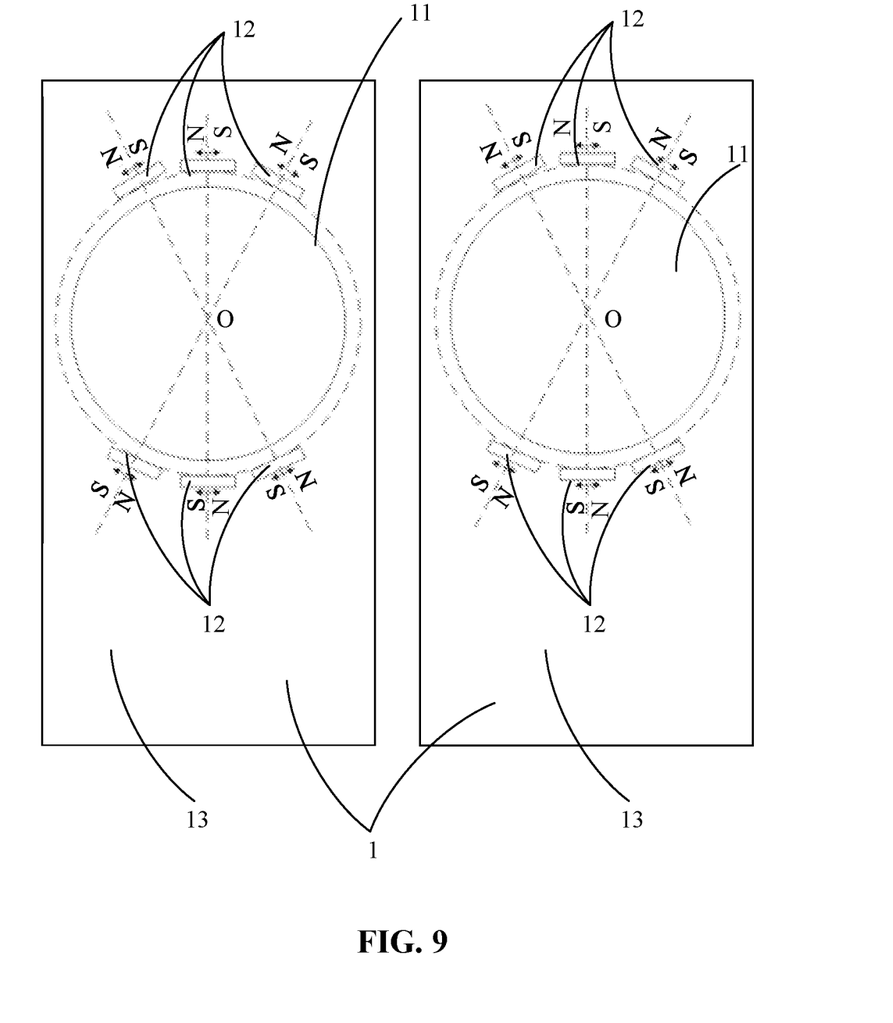
FIG. 9 is a perspective structural diagram of a charging system according to an exemplary embodiment of the present disclosure.

For example, as shown in FIG. 8 and FIG. 9, the charging system includes two charging devices 1. When the two charging devices 1 are mobile phones, each of the mobile phones includes multiple magnetic attracting portions 12 symmetrical with respect to the center point O. The magnetic attracting mating surfaces 13 of the two mobile phones are correspondingly fitted, and the two mobile phones can be positioned and aligned by the positioning structures formed by the magnetic attracting portions 12, and are charged through the position correspondence and mating of the charging portions 11.

The position correspondence between the charging portions 11 of the charging devices 1 may mean that the centers of the charging portions 11 of the charging devices 1 coincide with each other, or that there is an offset within a preset error range between the centers of the charging portions 11 of the charging devices 1. When the positions of the magnetic attracting portions 12 of the two charging devices 1 are aligned and mated, the positions of the magnetic attracting portions 12 correspond to each other, and the position correspondence of the magnetic attracting portions 12 may mean that the centers of the magnetic attracting portions 12 coincide with each other, or there is an offset within a preset error range between the centers of the magnetic attracting portions 12.

The magnetic attracting portions 12 are arranged symmetrically with respect to the charging portion 11, each of the magnetic attracting portions 12 includes an N pole and an S pole, at least one of the N poles and/or at least one of the S poles serving as a attracting function pole of the magnetic attracting portion 12; and a pair of the attracting function poles symmetrical with respect to the charging portion 11 is different in polarity. The above structural arrangement not only enables the charging device 1 to implement the adaption with the charging base and the power bank by using the magnetic attracting portions 12, but also enables the implementation of the adaptation between two charging devices 1 by using the attracting function poles that are arranged symmetrically and have different polarities, it is thus possible to improve the adaptability and usage convenience of the charging device 1 during the charging process.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A charging device, comprising:
   a charging portion and a plurality of magnetic attracting portions,
      wherein the plurality of magnetic attracting portions are symmetrically arranged with respect to the charging portion; and
      each of the plurality of magnetic attracting portions comprises an N pole and an S pole, at least one of the N poles or the S poles serving as an attracting function pole of the magnetic attracting portion; and a pair of attracting function poles symmetrical with respect to the charging portion are different in polarity,
      wherein the plurality of magnetic attracting portions comprise a plurality of mutually mating magnetic elements,
      wherein internal magnetic field directions of magnetic elements of a same magnetic attracting portion are same or opposite, and
      wherein the charging device comprises a magnetic attracting mating surface, and the magnetic elements of the same magnetic attracting portion are stacked in a direction perpendicular to the magnetic attracting mating surface.

2. The charging device of claim 1, wherein one or more of the plurality of magnetic attracting portions form a plurality of positioning structures, and the plurality of positioning structures have at least one of following shapes: a circle, an ellipse, or a rectangle.

3. The charging device of claim 1, wherein the charging portion comprises at least one centerline, and the plurality of magnetic attracting portions are arranged symmetrically with respect to the centerline.

4. The charging device of claim 1, wherein the charging portion comprises a center point, and the plurality of magnetic attracting portions are arranged symmetrically with respect to the center point.

5. The charging device of claim 1, wherein the plurality of magnetic attracting portions are arranged along a circumferential direction of the charging portion, and a first preset spacing is provided between one of the plurality of magnetic attracting portions and the charging portion.

6. The charging device of claim 5, wherein the plurality of magnetic attracting portions are uniformly distributed along the circumferential direction of the charging portion; or
   the first preset spacing between each of the plurality of the magnetic attracting portions and the charging portion is the same.

7. The charging device of claim 1, wherein a second preset spacing is provided between adjacent magnetic attracting portions.

8. The charging device of claim 1, wherein the plurality of magnetic attracting portions comprise at least one magnetic element; and each of a pair of magnetic attracting portions symmetrically arranged with respect to the charging portion has a same number of magnetic elements.

9. The charging device of claim 8, wherein the at least one magnetic element comprises at least one of following magnets: a bar magnet, a columnar magnet, or an irregularly shaped magnet.

10. A charging system, comprising:
    a charging device comprising a charging portion and a plurality of magnetic attracting portions,
       wherein the plurality of magnetic attracting portions are symmetrically arranged with respect to the charging portion; and
       each of the plurality of magnetic attracting portions comprises an N pole and an S pole, at least one of the N poles or the S poles serving as an attracting function pole of the magnetic attracting portion; and a pair of attracting function poles symmetrical with respect to the charging portion are different in polarity,
       wherein the plurality of magnetic attracting portions comprise a plurality of mutually mating magnetic elements,
       wherein internal magnetic field directions of magnetic elements of a same magnetic attracting portion are same or opposite, and
       wherein the charging device comprises a magnetic attracting mating surface, and the magnetic elements of the same magnetic attracting portion are stacked in a direction perpendicular to the magnetic attracting mating surface.

11. The charging system of claim 10, wherein one or more of the plurality of magnetic attracting portions form a plurality of positioning structures, and the plurality of positioning structures have at least one of following shapes: a circle, an ellipse, or a rectangle.

12. The charging system of claim 10, wherein the charging portion comprises at least one centerline, and the plurality of magnetic attracting portions are arranged symmetrically with respect to the centerline.

13. The charging system of claim 10, wherein the charging portion comprises a center point, and the plurality of magnetic attracting portions are arranged symmetrically with respect to the center point.

14. The charging system of claim 10, wherein the plurality of magnetic attracting portions are arranged along a circumferential direction of the charging portion, and a first preset spacing is provided between one of the plurality of magnetic attracting portions and the charging portion.

15. The charging system of claim 14, wherein the plurality of magnetic attracting portions are uniformly distributed along the circumferential direction of the charging portion; or the first preset spacing between each of the plurality of magnetic attracting portions and the charging portion is the same.

16. The charging system of claim 10, wherein a second preset spacing is provided between adjacent magnetic attracting portions.

17. The charging system of claim 10, wherein the plurality of magnetic attracting portions comprise at least one magnetic element; and each of a pair of magnetic attracting portions symmetrically arranged with respect to the charging portion has a same number of magnetic elements.

* * * * *